(12) United States Patent
Retsina

(10) Patent No.: US 7,490,027 B2
(45) Date of Patent: Feb. 10, 2009

(54) METHOD AND SYSTEM FOR LINEAR OPTIMIZATION OF A CONTINUOUS OR SEMI-CONTINUOUS PROCESS

(76) Inventor: Theodora Retsina, 56 17th St. N.E., Atlanta, GA (US) 30309

( * ) Notice: Subject to any disclaimer, the term of this patent is extended or adjusted under 35 U.S.C. 154(b) by 345 days.

(21) Appl. No.: 10/904,365

(22) Filed: Nov. 5, 2004

(65) Prior Publication Data
US 2005/0119768 A1    Jun. 2, 2005

Related U.S. Application Data

(60) Provisional application No. 60/517,551, filed on Nov. 6, 2003.

(51) Int. Cl.
*G06F 17/10* (2006.01)
(52) U.S. Cl. .............. 703/2; 700/28; 700/31; 700/47
(58) Field of Classification Search ............ 703/2; 700/28, 30, 31, 47, 108; 702/182; 705/7, 705/8, 10
See application file for complete search history.

(56) References Cited

U.S. PATENT DOCUMENTS 5,450,317 A * 9/1995 Lu et al. ............... 705/10
5,819,232 A * 10/1998 Shipman ............... 705/8
5,930,762 A * 7/1999 Masch ............... 705/7
2003/0097197 A1 * 5/2003 Parent et al. ............... 700/108

OTHER PUBLICATIONS

Gupta et al., P. Simulation Model for Aircraft Line Maintenance Planning, IEEE, Reliability and Manitainability Symposium, Jan. 2003, pp. 387-391.*
Perea-Lopez et al., E. A Model Predictive Control Strategy for Supply Chain Optimization, Computers & Chemical Engineering, vol. 2, Sep. 2003, pp. 1201-1218.*
Jayaraman et al., V. Planning and Coordination of Production and Distribution Facilities for Multiple Commodities, European Journal of Operational Research, vol. 133, Jan. 2001, pp. 394-408.*
Kim et al., B.-I. A Hybrid Scheduling and Control System Architecture for Warehouse Management, IEEE Transactions on Robotics ad Automation, vol. 19, No. 6, Dec. 2003, pp. 991-1001.*

* cited by examiner

*Primary Examiner*—Russell Frejd

(57) ABSTRACT

A method and system for generating and solving production model algorithms for the optimum management of production rates, equipment utilization, raw material, utilities, inventories and production schedule so as to increase total output and/or decrease total cost per unit of production for a continuous or semi-continuous manufacturing facility. The application updates dynamically so that users are provided real-time optimized production decisions on the basis of current information.

6 Claims, 13 Drawing Sheets

The Present Invention's Software Application System Structure

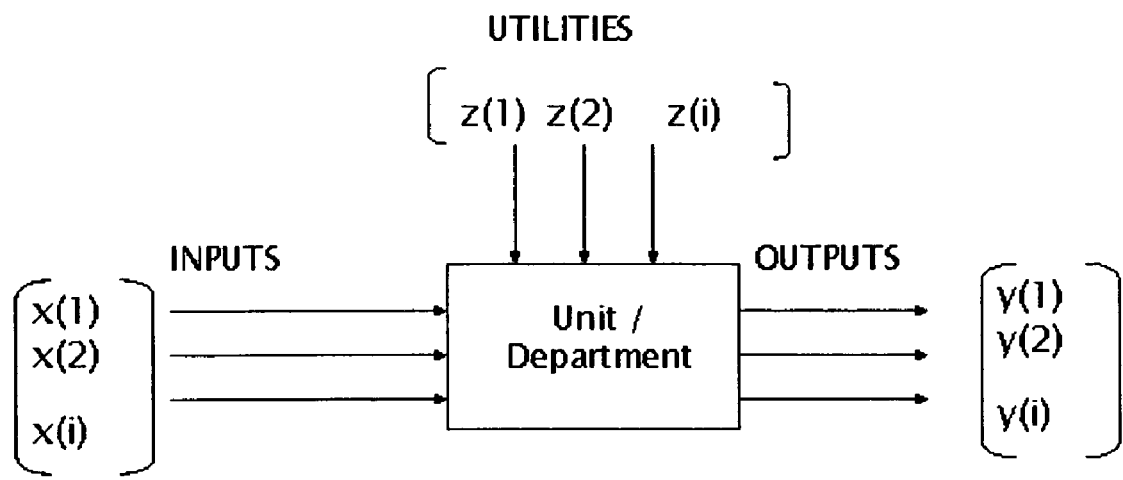
Figure 1. Typical Unit or Department Model

Figure 2. Division of Optimization Time Horizon Using Period Wizard
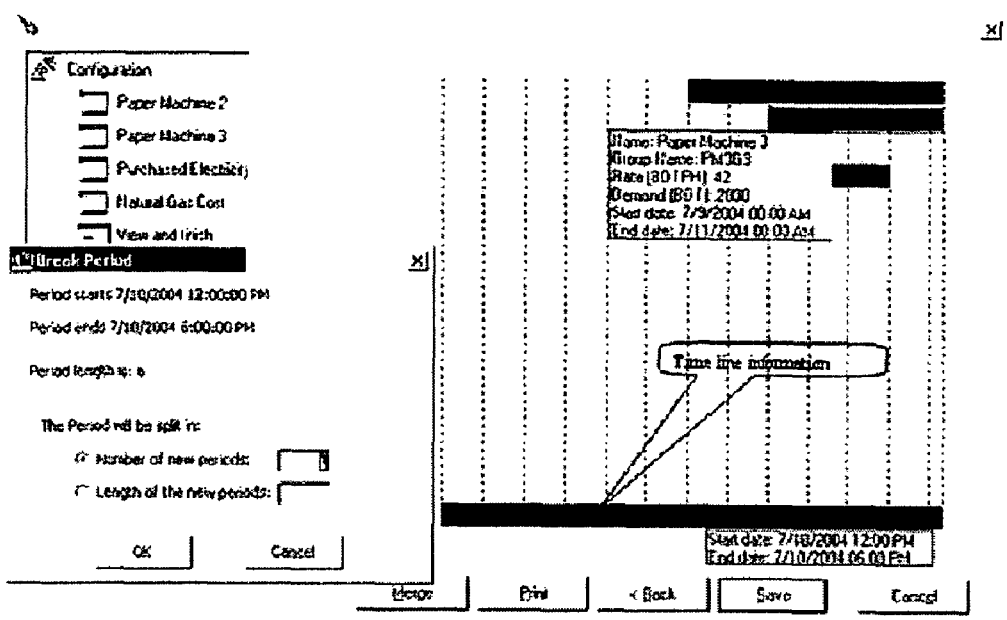
Figure 3. The Present Invention's User Gap Analysis Results
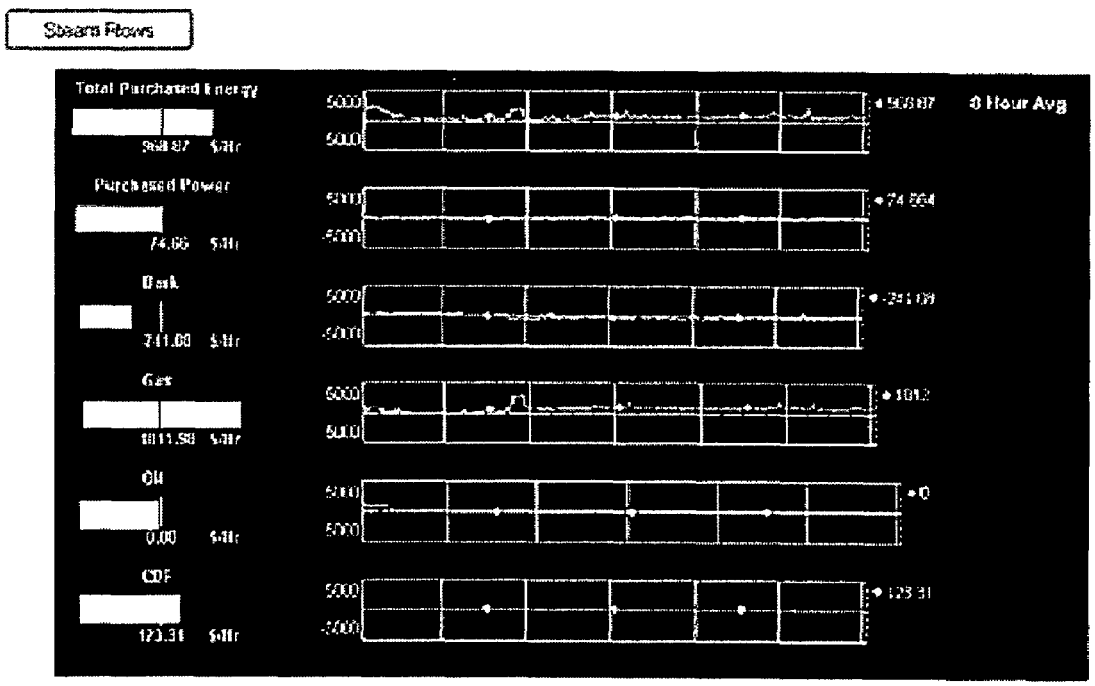

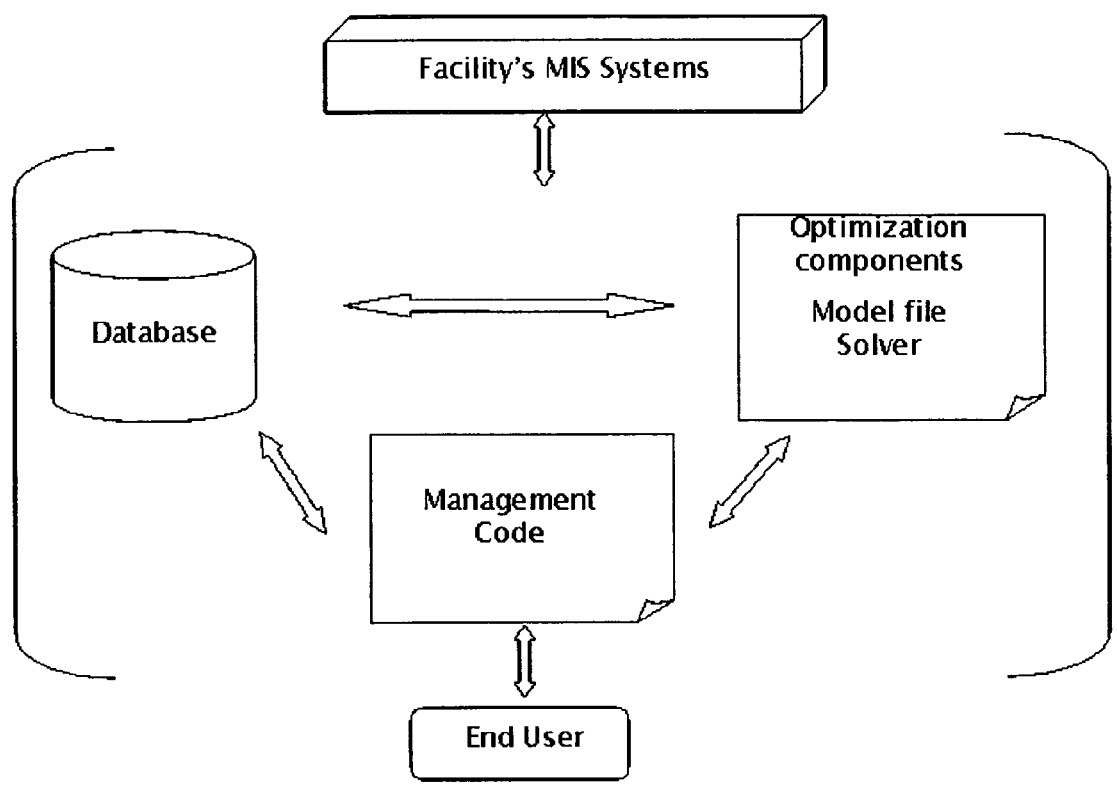
Figure 4. The Present Invention's Software Application System Structure

Symbols

$U$ set of Units, index $i$,
$V$ set of Variables, index $j$,
$P$ set of Periods, index $k$,
$Q$ set of Equations, index $q$,
$VInt \subseteq V$ set of Input Flows, index $q$,
$VOut \subseteq V$ set of Output Flows, index $l$,
$VInl \subseteq V$ set of Internal Flows, index $m$,
$VInv \subseteq V$ set of Inventoried Flows, index $b$,
$MG \subseteq U$ set of group modes, index $mg$,
$G \subseteq V_{out}$ set of Grades produced in the mill, index $g$,
$WF$ set of Objective Function weight factors, index $w$, The variables used in the model building are the following:

| | |
|---|---|
| $chcost_i$ | startup cost for a piece of equipment or department |
| $seqns_i$ | the minimum limit of hours that should intervene between a shutdown and a startup of an equipment or department |
| $sdwn_i$ | the number of hours that a unit must remain out of operation after a shutdown |
| $ratechange_i$ | the limit of an equipment or department rate change above which the rate change penalty increases (*soft rate change limit*) |
| $length_k$ | the length of each period in hours |
| $lperiods$ | number of periods that the time horizon is divided into |

Figure 5      Page 1 of 10

| | |
|---|---|
| *sellgoalmin*$_i$ | minimum amount of sellable product during the optimization time frame |
| *sellgoalmax*$_i$ | maximum amount of saleable product during the optimization time frame |
| *symbopen*$_{i,k}$ | binary variable defining equipment or department $i$ status during period $k$, 1:forced open 0: free, user input |
| *symbclose*$_{i,k}$ | binary variable defining equipment or department $i$ status during period $k$, 1:forced close 0: free, user input |
| *binopen*$_{i,k}$ | binary variable defining equipment or department $i$ status during period $k$, 1: open 0: free, decision variable |
| *binclose*$_{i,k}$ | binary variable defining equipment or department $i$ status during period $k$, 1: close 0: free, decision variable |
| *unitopen*$_{i,k}$ | binary variable defining equipment or department status change during period $k$, closed to open |
| *unitclose*$_{i,k}$ | binary variable defining equipment or department status change during period $k$, open to close |
| *closepen*$_{i,k}$ | shutdown / startup penalty assignment variable |
| *minload*$_{i,k}$ | minimum operating limit for equipment or department $i$ during period $k$ |
| *maxcap*$_{i,k}$ | maximum operating limit for equipment or department during period $k$ |

Figure 5      Page 2 of 10

| | |
|---|---|
| $ratechpen_{i,k}$ | a virtual monetary penalty applied in the ObjFn if equipment or department $i$ during period $k$ exceed the soft rate change limit |
| $ratechpenc_{i,k}$ | a virtual monetary penalty applied in the ObjFn if the activity of equipment or department $i$ during period $k$ is different than period $k-1$ |
| $ratepenupc_{i,k}$ | a variable defining the positive total rate change of equipment or department $i$ during period $k$ |
| $ratependoc_{i,k}$ | a variable defining the negative total rate change of equipment or department $i$ during period $k$ |
| $ratepenup_{i,k}$ | a variable defining the positive rate change of equipment or department $i$ during period $k$, that exceeds the soft rate change limit |
| $ratependo_{i,k}$ | a variable defining the negative rate change of equipment or department $i$ during period $p$, that exceeds the soft rate change limit |
| $slacku_{i,k}$ | slack variable used for modeling the rate change management |
| $slackp_{i,k}$ | slack variable used for modeling the rate change management |
| $openr_b$ | starting inventory value for inventoried material $b$ |
| $inputcost_{q,k}$ | cost of input variable $q$ during period $k$ |
| $inputsup_{q,k}$ | maximum purchase limit of input variable $q$ during period $k$ |
| $inputsdo_{q,k}$ | minimum purchase limit of input variable $q$ during period $k$ |

Figure 5

| | |
|---|---|
| $inputsvalue_{q,k}$ | activity of input variable $q$ during period $k$ |
| $outputpr_{l,k}$ | sell price of output variable $q$ during period $k$ |
| $outputsup_{l,k}$ | maximum sell limit of output variable $q$ during period $k$ |
| $outputsdo_{l,k}$ | minimum sell limit of output variable $q$ during period $k$ |
| $outputsvalue_{l,k}$ | activity of output variable $q$ during period $k$ |
| $grademin_{g,k}$ | minimum demand of grade $g$ during period $k$ |
| $grademax_{g,k}$ | maximum demand of grade $g$ during period $k$ |
| $value_{i,j,k}$ | activity of variable $j$ in equipment $i$ during period $k$ |
| $target_{b,k}$ | target value for the activity of inventoried variable $b$ during period $k$ |
| $hcost_{b,k}$ | virtual monetary penalty value assigned to the inventoried variable $b$ during period $k$, when activity value exceeds target value |
| $pcost_{b,k}$ | virtual monetary penalty value assigned to the inventoried variable $b$ during period $k$, when activity value exceeds target value |
| $storvarup_{b,k}$ | maximum value for the inventoried variable $b$ during period $k$, when activity value exceeds target value |
| $storvardo_{b,k}$ | minimum value for the inventoried variable $b$ during period $k$, when activity value exceeds target value |

Figure 5      Page 4 of 10

| | |
|---|---|
| $invvalue_{b,k}$ | activity of inventory variable $b$ during period $k$ |
| $coeff_{j,i}$ | a variable indicating correlation between variable $j$ and unit $i$, if value =1 the variable $j$ is produced in unit $i$, if value =−1 then variable $j$ is consumed in unit $i$, if value =0 then there is no correlation between variable $j$ and unit $i$. |
| $wf_w$ | weight factors used in the objective function |

The equations used in the model are the following:

Energy and Mass balances: Each unit $U$ it is described by a unit matrix $UM_i$ and a vector of constants $UCON_i$. A unit matrix $UM_i$, consists of a number of rows which correspond to the material and energy balance equations needed to describe in the desired detail the operation of the unit while the number of the columns consist of a subset of the variables $V_j$ set containing these variables that are related with the unit. The vector of constants $UCON_i$ contains the constants that correspond to each row (equation).

Therefore the first set of equations that describe the energy and mass balances within the units has as follows:

$$\sum_j [M_{i,j} * Value_{i,j,k} + UCON_{i,j}] = 0$$

The sets of equations that describe the mass balance between the units are the following:

For variables $X_j \subseteq VInv$ and $X_j \subseteq VInt$:

$$inputsvalue_{j,k} = \sum_i [-coeff_{i,j} * Value_{i,j,k} + Inv_{j,k} - Inv_{j,k-1}], \text{ for } k > 1$$

$$inputsvalue_{j,k} = \sum_i [-coeff_{i,j} * Value_{i,j,k} + Inv_{j,k} - openr_j], \text{ for } k = 1$$

Figure 5

For variables $X_j \subseteq VInv$ and $X_j \subseteq VOut$:

$$outputsvalue_{j,k} = \sum_i [-coeff_{i,j} * Value_{i,j,k} + Inv_{j,k} - Inv_{j,k-1}], \text{ for } k>1$$

$$outputsvalue_{j,k} = \sum_i [-coeff_{i,j} * Value_{i,j,k} + Inv_{j,k} - openr_j], \text{ for } k=1$$

For variables $X_j \subseteq VInv$ and $X_j \subseteq VInI$:

$$\sum_i [coeff_{i,j} * Value_{i,j,k} + Inv_{j,k} - Inv_{j,k-1}], \text{ for } k>1$$

$$\sum_i [coeff_{i,j} * Value_{i,j,k} + Inv_{j,k} - openr_j], \text{ for } k=1$$

For variables $X_j \not\subseteq VInv$ and $X_j \subseteq VInt$:

$$inputsvalue_{j,k} = \sum_i [-coeff_{i,j} * Value_{i,j,k}], \text{ for all } k$$

For variables $X_j \not\subseteq VInv$ and $X_j \subseteq VOut$:

$$outputsvalue_{j,k} = \sum_i [coeff_{i,j} * Value_{i,j,k}], \text{ for all } k$$

For variables $X_j \not\subseteq VInv$ and $X_j \subseteq VinvI$:

$$\sum_i [coeff_{i,j} * Value_{i,j,k}] = 0, \text{ for all } k$$

Figure 5

Units / Inventories capacity limits:

For all units $U_i$ :

$$Value_{j,i,k} \leq \max cap_{j,i,k} * binopen_{i,k}, \text{ for all } k$$

$$Value_{j,i,k} \geq \min load_{j,i,k} * binopen_{i,k}, \text{ for all } k$$

For all variables $V_j \subseteq VInv=$:

$$invvalue_{j,k} \leq storvarup_{j,k}, \quad \text{for all } k$$

$$invvalue_{j,k} \geq storvardo_{j,k}, \quad \text{for all } k$$

For all variables $V_j \subseteq VInt$:

$$inputsvalue_{j,k} \leq inputsup_{j,k} * length_k \quad \text{for all } k$$

$$inputsvalue_{j,k} \geq inputsdo_{j,k} * length_k \quad \text{for all } k$$

For all variables $V_j \subseteq VOut$:

$$outputsvalue_{j,k} \leq outputsup_{j,k} * length_k \quad \text{for all } k$$

$$outputsvalue_{j,k} \geq outputsdo_{j,k} * length_k \quad \text{for all } k$$

Figure 5

On / Off units status, modes of operation and rate change management:

For all units $U_i$ :

$binopen_{i,k} + binclose_{i,k} = 1$ for all $k$ $binopen_{i,k} \geq symbopen_{i,k}$, for all $k$
$binclose_{i,k} \geq symbclose_{i,k}$, for all $k$ $binclose_{i,k} - binclose_{i,k-1} + unitopen_{i,k} - unitclose_{i,k} = 0$, for $k > 1$ $\sum_{mg} binopen_{mg,k} \leq 1$, for each $k$ $seqns_i^* unitopen_{i,k} - \sum_{k+1}^{k+seqns_i-1}[binopen_{i,k}] \leq 0$, for $k > 1$ and $k < lperiods - seqns_i + 1$ $seqns_i^* unitopen_{i,k} - \sum_{k+1}^{lperiods}[binopen_{i,k}] \leq seqns_i - lperiods + k - 1$ ,for $k > lperiods - seqns_i + 1$ $\sum_{}^{sdmw_i}[binclose_{i,k}] = sdwn_i$, for $k < sdwn_i$ $binclose_{i,k-1} - binclose_{i,k} + closepen_{i,k} \geq 0$, for all $k$ $value_{i,j,k} / len_k - value_{i,j,k-1} / len_{k-1} - ratepenupc_{i,k} + ratependoc_{i,k} = 0$ for $k > 1$ and $j :=$ rate control variable $value_{i,j,k} / len_k - value_{i,j,k-1} / len_{k-1} - ratechange_{i,k} - ratepenup_{i,k} + slack_{i,k} = 0$ for $k > 1$ and $j :=$ rate control variable

Figure 5

$$value_{i,j,k} / len_k - value_{i,j,k-1} / len_{k-1} + ratechange_{i,k} + ratepenup_{i,k} - slack_{i,k} = 0$$

for $k>1$ and $j :=$ *rate control variable*

Inventory targets management:

For variables $X_j \subseteq Vinv$:

$$invvalue_{j,k} - target_{j,k} - invmatup_{j,k} + invmatdo_{j,k} = 0, \text{ for all } k$$

Grades management:

$$outputsvalue_{l,k} \geq grademin_{l,k}, \text{ for all } k$$

$$outputsvalue_{l,k} \leq grademax_{l,k}, \text{ for all } k$$

Figure 5

Total output management:

For variables $X_j \subseteq VOut$ $$\sum[outputsvalue_{i,k}] \geq sell\ goalmin_l, \text{ for all } k$$

$$\sum[outputsvalue_{i,k}] \leq sell\ goalmax_l, \text{ for all } k$$

Objective function:

$$\text{maximize} := \sum \begin{bmatrix} wf_w * \sum_i outputsvalue_{l,k} \\ \\ -wf_w * \sum_q inputsvalue_{q,k} \\ \\ -wf_w * \sum_i \begin{bmatrix} unitclose_{i,k} * chcost_i * (1-symbclose_{i,k}) \\ (ratepenup_{i,k} + ratependo_{i,k}) * ratechpen_{i,k} \\ (ratepenupc_{i,k} + ratependoc_{i,k}) * ratechpenc_{i,k} \end{bmatrix} \\ \\ -wf_w * \sum_i [invmatup_{b,k} * Hcostp_{b,k} + invmatdo_{b,k} * Pcostb_{,k}] \end{bmatrix}$$

Figure 5

METHOD AND SYSTEM FOR LINEAR OPTIMIZATION OF A CONTINUOUS OR SEMI-CONTINUOUS PROCESS

FIELD OF THE INVENTION

This invention relates, in general, to the optimization of the operations in the process industry, and more particularly to the optimum management of resources and production schedule so as to increase total output and/or decrease total cost of production for a continuous or semi-continuous manufacturing facility.

BACKGROUND OF THE INVENTION

Production planning in the process industry is today more complicated than ever. A manufacturing facility should not only output production in a certain period, but also ensure that each unit of production is produced with maximum profitability. Numerous factors, such as prices and availability of raw material and utilities, production demands for different products, equipment availability, etc., should therefore be taken under consideration before proceeding with any production plan.

Decisions have to be made under time pressure for a multitude of reasons, e.g., just-in-time production and delivery techniques, production upsets, raw material/energy curtailment, product type changes, planned/unplanned maintenance, etc. Managers and operators should evaluate each of these constraints before determining how best to operate each part of the manufacturing facility in order to meet the overall primary objective, e.g., minimize the overall production cost.

Raw material purchase agreement formulas, real-time-pricing of purchased electricity, self-generated energy, departmental rate change limitations, restricted buffer storage capacity, and recycle streams within the manufacturing facility add considerably to the complexity of the decision making process.

Manufacturing facilities in general do not have a way for truly optimized decision making. Conventional decision making is usually based on previous experience and rules-of-thumb. In most cases these decisions are made to provide short-term localized production targets without taking under consideration all the different alternatives, the impact on the entire manufacturing facility, and their affect in the final objective. As a result production unit cost minimization is not achieved and overall profits are not maximized.

Accordingly a need exists for a convenient, real-time method of providing easily accessible, truly optimized production decisions in continuous and semi-continuous manufacturing facilities.

SUMMARY OF THE IVENTION

The present invention is an automatically updating, on-line software application system that continuously provides real-time optimized operating set points for each production department, each boiler/turbine-generator, and purchased utilities for a continuous or semi-continuous manufacturing facility. Optimized decisions are exportable for electronic distribution to provide easy access by all connected authorized users.

BRIEF DESCRIPTION OF THE DRAWINGS

A more complete understanding of the present invention may be obtained by reference to the following Detailed Description when read in conjunction with the accompanying Drawings wherein:

FIG. 1 illustrates a typical unit or department model.

FIG. 2 illustrates the division of the optimization time horizon into periods using the present invention's wizard tool.

FIG. 3 illustrates a typical user's gap analysis display.

FIG. 4 illustrates the present invention's software application system structure.

FIG. 5 is the detailed description of the present invention's model including the equation structure.

DETAILED DESCRIPTION OF THE INVENTION

The present invention methodology uses a mathematical model to represent a continuous or semi-continuous manufacturing facility. This mathematical model is a matrix of algorithms comprised of the following modules:

Units: In the invention, model Units are basic elements, which represent major and critical process equipment that are modeled as single unit 'black boxes', converting inputs to outputs using the equipment's required utilities. Specifically, Units are modeled as sets of linear equations, which depict the energy and material balances around them. Each Unit has a minimum number of characteristics such as: maximum and minimum operating limits, preferred operating rates, alternative modes of operation, associated input and output flows, forced open and forced closed flags. A representation of a typical Unit is seen in FIG. 1.

Departments: In the invention model, departments are also basic model entities that represent an area of the process which consists of a number of Units that perform a specific task and can be modeled as single black boxes in a similar way as the Units. Departments are modeled as sets of linear equations, which depict the overall energy and material balances around the department. Each Department has a minimum number of characteristics such as: maximum and minimum operating limits, preferred operating rates, alternative modes of operation, input and output flows associated with it, forced open and forced close flags, and internal flows between the different equipment within the Department. An illustration of a typical Department is also seen in FIG. 1.

Flows: In the invention model, Flows are model entities that represent the actual material movement and material transformation between the different Units and Departments of the model. Flows can be classified into three categories: input flows, output flows, and internal flows. There is also one subcategory for inventoried flows.

Input Flows: In the invention model, Input Flows are models of all the raw material and utilities that are being used by the facility. Each Input Flow has a minimum number of characteristics such as minimum and maximum available quantity and corresponding cost.

Output Flows: In the invention model, Output Flows are models of all the products and by-products of the facility as well as any material that leaves the facility's boundaries. Each Output Flow has a minimum number of characteristics such as minimum and maximum demand, quantity and corresponding price.

Internal Flows: In the invention model, Internal Flows are models of all the material flows that start and end within the boundaries of the facility. Each Internal Flow has a minimum number of characteristics such as minimum and maximum flow quantity.

Inventory Flows: In the invention model, the Inventory Flows are models of all the input, output, and internal flows, that can be inventoried. Each Inventory Flow has, in addition to its inherited characteristics, an additional number of minimum characteristics such as minimum and maximum storage capacity.

Operating Practices: In the invention model, mathematical expressions are included to account for actual operating practices such as lead/lag times for bringing a unit or department on-line or off-line, monetary costs associated with unit or department start-ups and shut-downs, preferred operating rates, operating ratios, product recipes, etc.

Periods: In the invention model, the optimization time horizon is divided into time increments called periods. Its start time and its length define each period. During each period the facility is considered to operate at steady-state conditions and flows characteristics do not change. Division of the optimization time horizon into periods is done though a tool termed Period Wizard.

Special Contract Terms: In the invention model, special contract terms for purchasing and/or selling raw materials, energy, products, etc., are expressed as mathematical equations to accurately reflect each particular contract term and condition. These equations are incorporated into the overall optimization model.

Optimization Model: In the invention model, all the aforementioned modules, i.e., Units, Departments, Flows, Periods, Operating Practices, and Special Contract Terms are configured together to create an optimization model (mathematical programming matrix) accurately representing the entire manufacturing facility production process.

A detailed description of the invention model is presented in FIG. 5.

Once a manufacturing facility is set up as the mathematical model it is populated with the default attributes (characteristics) for each modeled unit, department, and flow.

A significant element of a unit or department is its efficiency, i.e., quantity of outputs as a function of inputs. These efficiencies are included as mathematical expressions based on actual performance. Since efficiencies will vary over time due to unit/department deterioration, maintenance, cleaning, replacement, reconfiguration, upgrade, etc., the present invention includes an on-line self-learning function to monitor and automatically adjust the associated mathematical expressions over time.

The present invention includes an electronic data transfer interface termed MIS Link. The MIS Link interface takes its name from the acronym of Management Information System (MIS) which most manufacturing facilities have available and which records data about processes and usages of all furnish materials and energy necessary in the facility's manufacturing process. The MIS Link interface is therefore linked with the MIS system and allows downloading/uploading of the appropriate data on a real-time basis.

In the preferred form of the invention required final product quantities by type, inputs for raw material and purchased utility costs, current operating rates/inventories, and temporary constraints imposed on the manufacturing facility process are automatically downloaded to the application via the MIS Link. Alternatively these can be entered manually through the application's graphical user interface.

In the preferred form of the invention, an update routine is also included. This routine downloads the facility's real-time data to the application, runs the application's generic linear optimizer engine and uploads the optimized decisions automatically at fixed (adjustable) time intervals.

In the preferred form of the invention, a trigger routine is also included. This routine downloads the facility's real-time data to the application, runs the application's optimization engine and uploads the optimized decisions automatically whenever the actual facility data changes by a pre-determined (adjustable) amount, either as a discrete value or as a percentage change.

Period Wizard: In the present invention, the Period Wizard is a tool that implements an automated process of dividing the optimization time horizon into smaller time increments called periods. Two options are available in the Period Wizard for dividing the time horizon. In the first one, the user defines a default length for each period and a number of equal-length periods is automatically created covering the whole time horizon; the last period's length could be truncated in order to adjust to the end of the time horizon. In the second option, the user introduces events that will take place during the optimization time horizon and the application then automatically creates the periods in such a way that neither the start nor the end of any event lie within a period but coincide with period edges, i.e., the they set the period time boundaries. This is shown in FIG. 2.

Gap Analysis: In the present invention, the Gap Analysis is a function that makes a real-time comparison between the optimized production decisions against the actual production operation, determines the comparison gap (difference), analyses the lost opportunities in terms of cost, and outputs the cost penalties together with a recommendation for corrective actions to the facility's MIS for a real-time user awareness of the penalty associated with not following the optimized production decisions. An example of this is illustrated in FIG. 3.

Application System Structure: In the present invention, the application system structure consists of a database used for data storage, a graphical user interface facilitating data communication between the user and the storage device and the optimization components, optimization model, the optimization model solver, and the MIS Link electronic data transfer interface to link the invention software application with the facility's MIS system on a real-time basis. This is depicted is FIG. 4.

The invention optimization parameters will have many manifestations, including product units, labor, raw materials, energy, unit costs, etc. In these manifestations this software application is customized to cover any optimization variable in any manufacturing facility.

Although other modifications and changes may be suggested by those skilled in the art, it is the intention of the inventors to embody within the patent warranted hereon all changes and modifications as reasonably and properly come within the scope of their contribution to the art.

What is claimed is:

1. A method for satisfying a selected objective function by optimizing the production resources and production schedule of continuous and semi-continuous manufacturing facilities comprising:

providing a customizable software application and computerized system to perform the following steps:

configure a mathematical model of a manufacturing facility in terms of its major process departments, utilities and raw materials;

configure a mathematical model of major process departments in terms of their major process equipment;

configure a mathematical model of major process equipment;

configure a mathematical model of flows between major process departments and between major process equipment;

configure a mathematical model of purchased utility contracts;

configure the mathematical models into a matrix to provide an optimized solution to an objective function;

enter default attributes for major process departments and major process equipment;

create a data transfer interface between said customizable software application and the facility's Management Information System (MIS);

enter current material and utility costs, department operating rates, inventory levels, and temporary process constraints into said customizable software application;

run a mathematical equation matrix solver software to generate optimized production decisions;

execute a gap analysis of the optimized production decisions and actual production operation of said manufacturing facility to generate a comparison gap;

store the optimized production decisions from the solver software and the comparison gap; and electronically export the optimized production decisions, the comparison gap and recommended corrective actions to the facility's MIS and/or print these as hard copy reports.

2. A method according to claim 1, further comprising the steps of:

modeling facilities in said customizable software application by selecting major process departments from a library of pre-configured modules or by customizing a configurable generic module;

modeling departments in said customizable software application by selecting major process equipment units from a library of pre-configured modules or by customizing a configurable generic module;

modeling interconnections between departments and units in said customizable software application by selecting flows from a library of pre-configured modules or by customizing a configurable generic module; and modeling operating practices by completing pre-configured menus.

3. A method according to claim 1, further comprising the steps of:

providing an automatic data entry interface between the facility's MIS and said customizable software application, including a routine that downloads data, runs the mathematical equation matrix solver software, runs the comparison gap and automatically uploads optimized production decisions and comparison gap to the MIS to provide real-time information; and initiating an automatic routine both from a scheduler routine with user determined time intervals and from the application's trigger routine that detects when the MIS data values have changed by a user adjustable, discrete or percentage amount.

4. A method according to claim 1, further comprising the steps of:

date-time stamping downloaded MIS data, uploaded optimized production decisions, and uploaded comparison gap and storing these in a data base of said customizable software application;

identifying opportunities from the comparison gap, generating recommended corrective actions and flagging these to the user through the user's MIS or a graphical user interface; and identifying out-of-range or infeasible production decisions and flagging these to the user through the user's MIS or a graphical user interface.

5. A method according to claim 1, further comprising the steps of:

enabling the user to make manual entries to said customizable software application, run the mathematical equation matrix solver software, run the comparison gap, and view optimized production decisions and comparison gap through a customizable graphical user interface; and enabling the user to generate and save customized off-line 'what-if' scenarios via the customizable_graphical user interface.

6. A method according to claim 1, further comprising the steps of:

allowing authorized users to access said customizable software application, make changes to the mathematical model, enter data, run the mathematical equation matrix solver software, run the comparison gap, and/or observe optimized production decisions and comparison gap for the manufacturing facility, at any given time from any computer with access to the world wide web or to a computer connected to the same local area network to which said customizable software application is connected; and outputting the optimized production decisions, comparison gap, and other user selectable reports to a video terminal or in a paper form.

* * * * *